Feb. 28, 1939.　　　　　F. O'NEILL　　　　　2,148,494
GLASS FORMING MACHINE
Filed April 25, 1929　　14 Sheets-Sheet 2
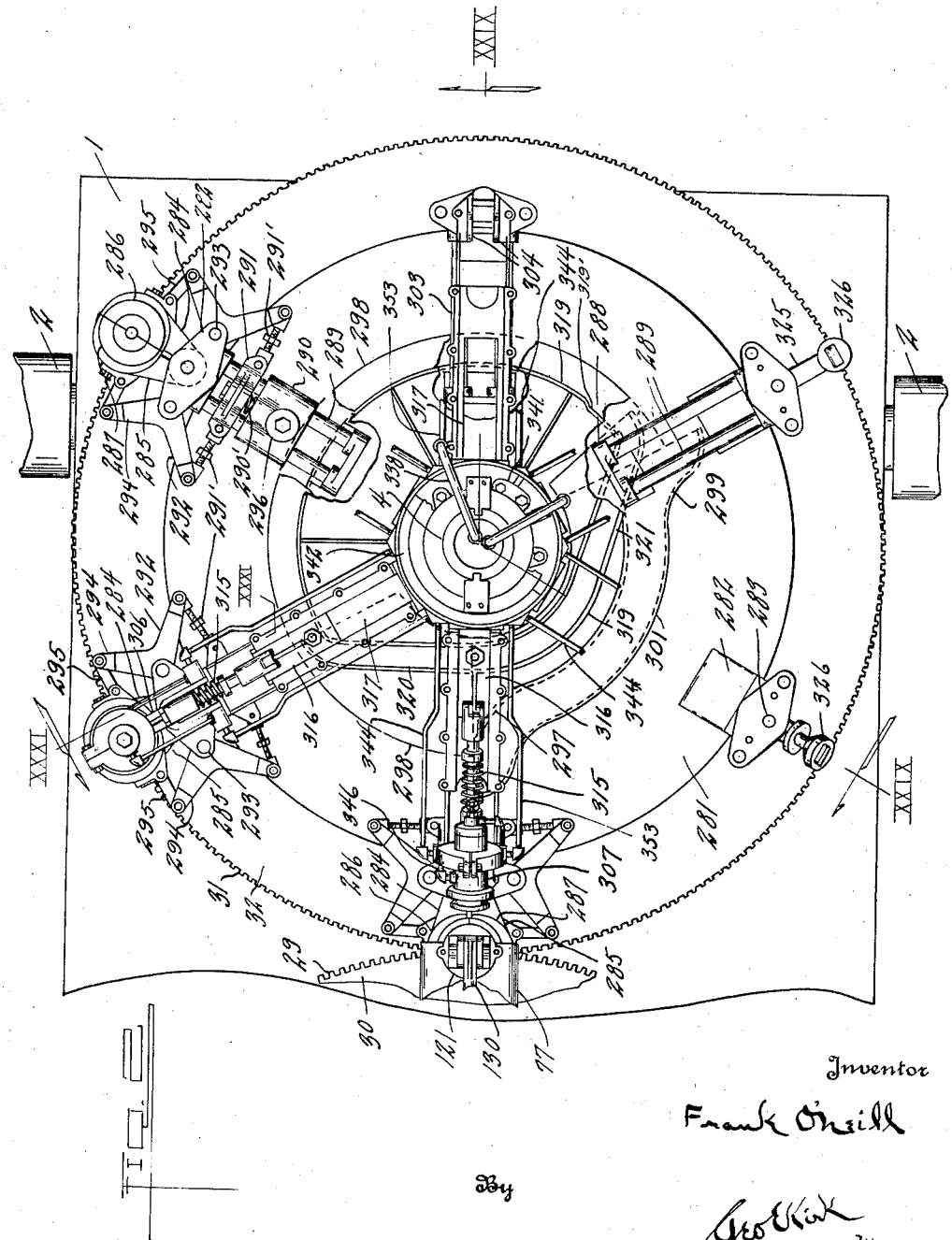
Inventor
Frank O'Neill
By
Geo Kirk
Attorney

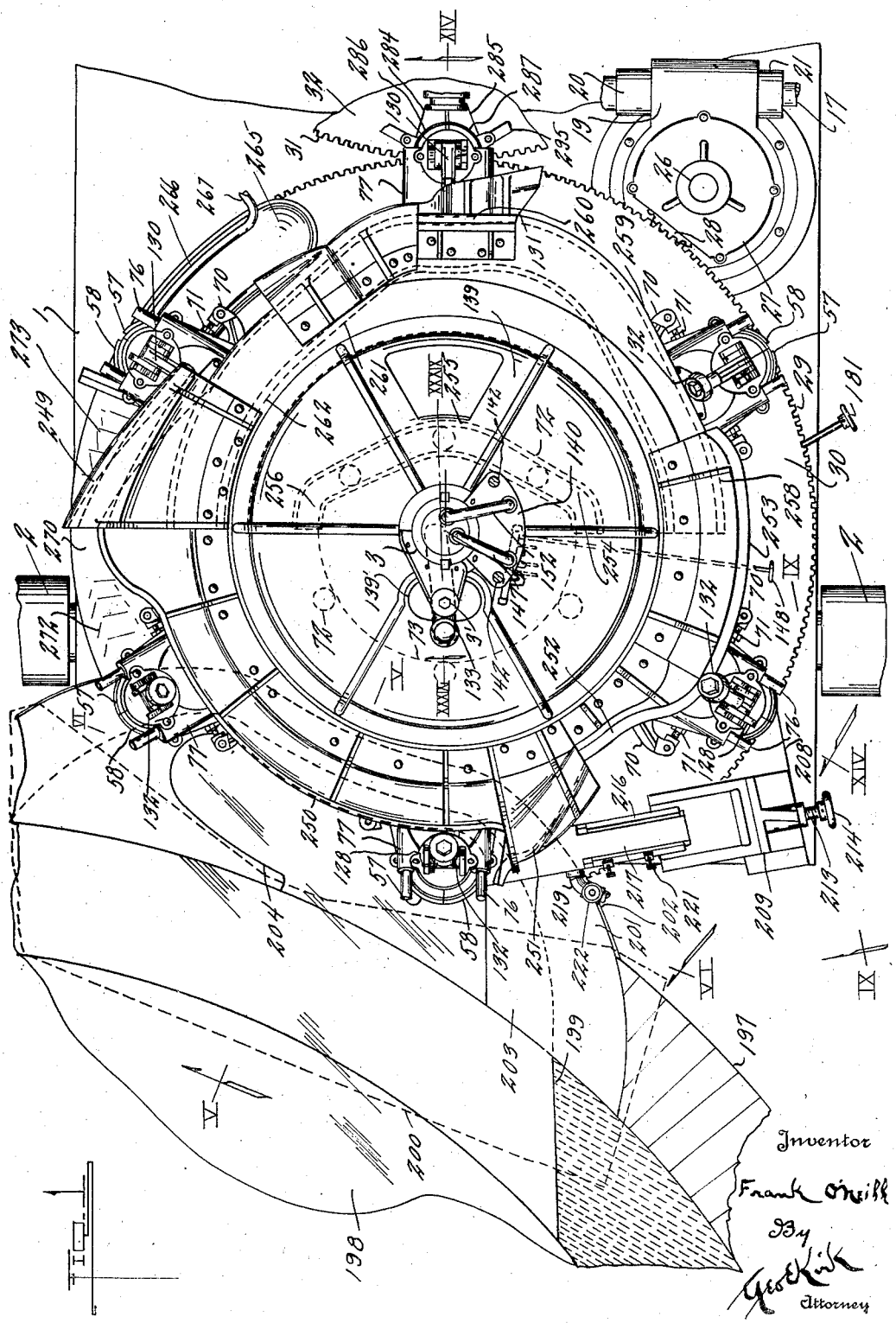

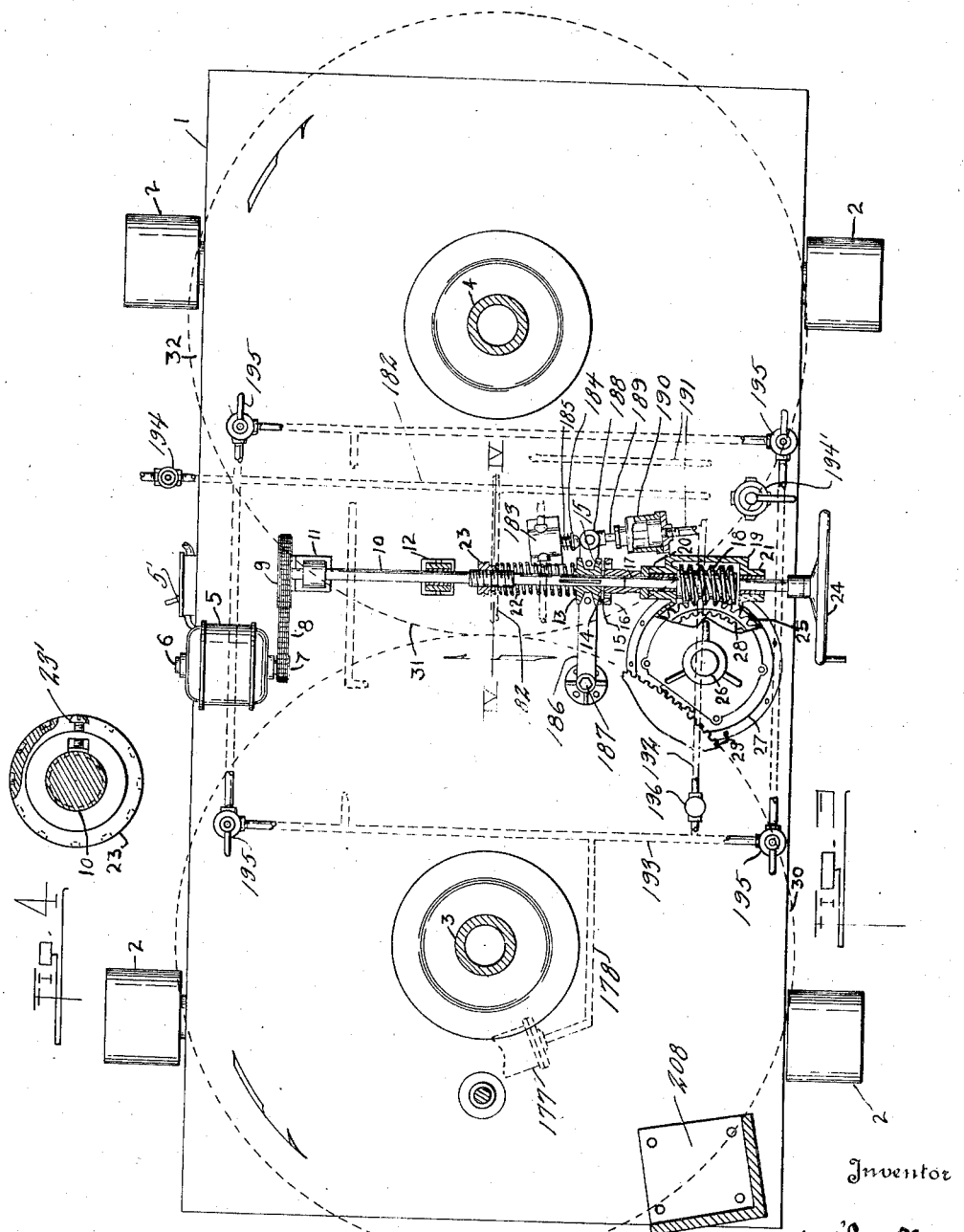

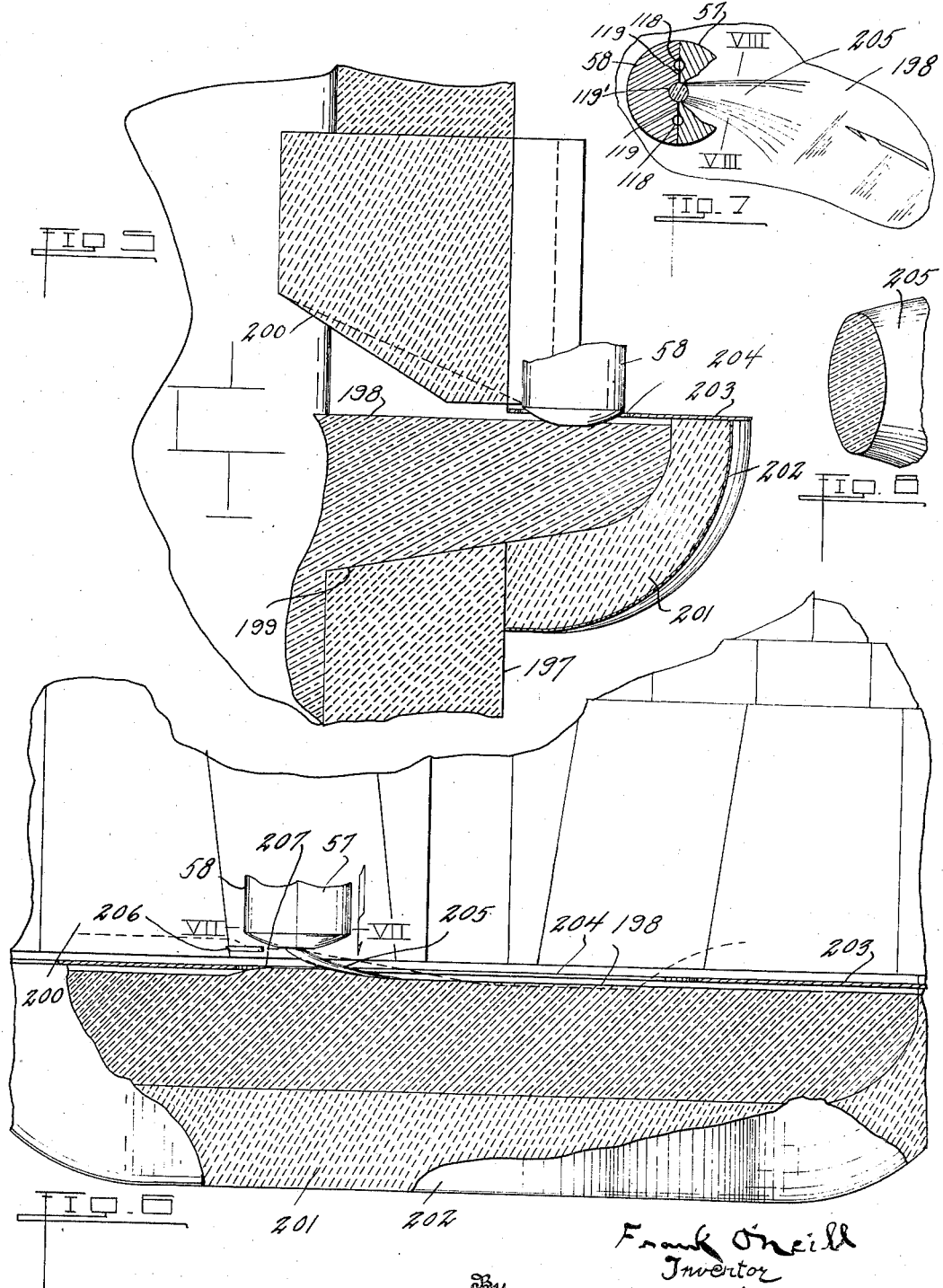

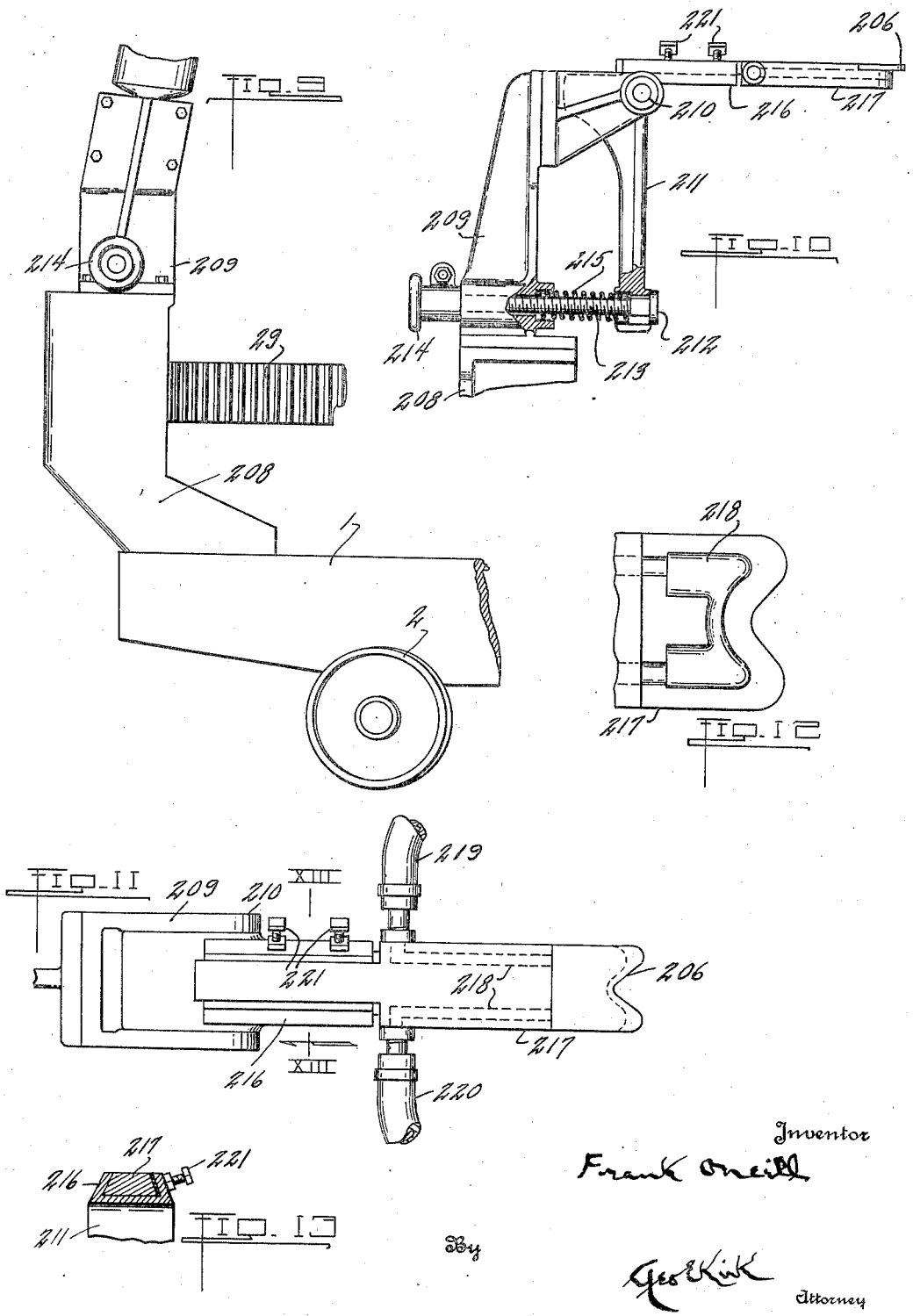

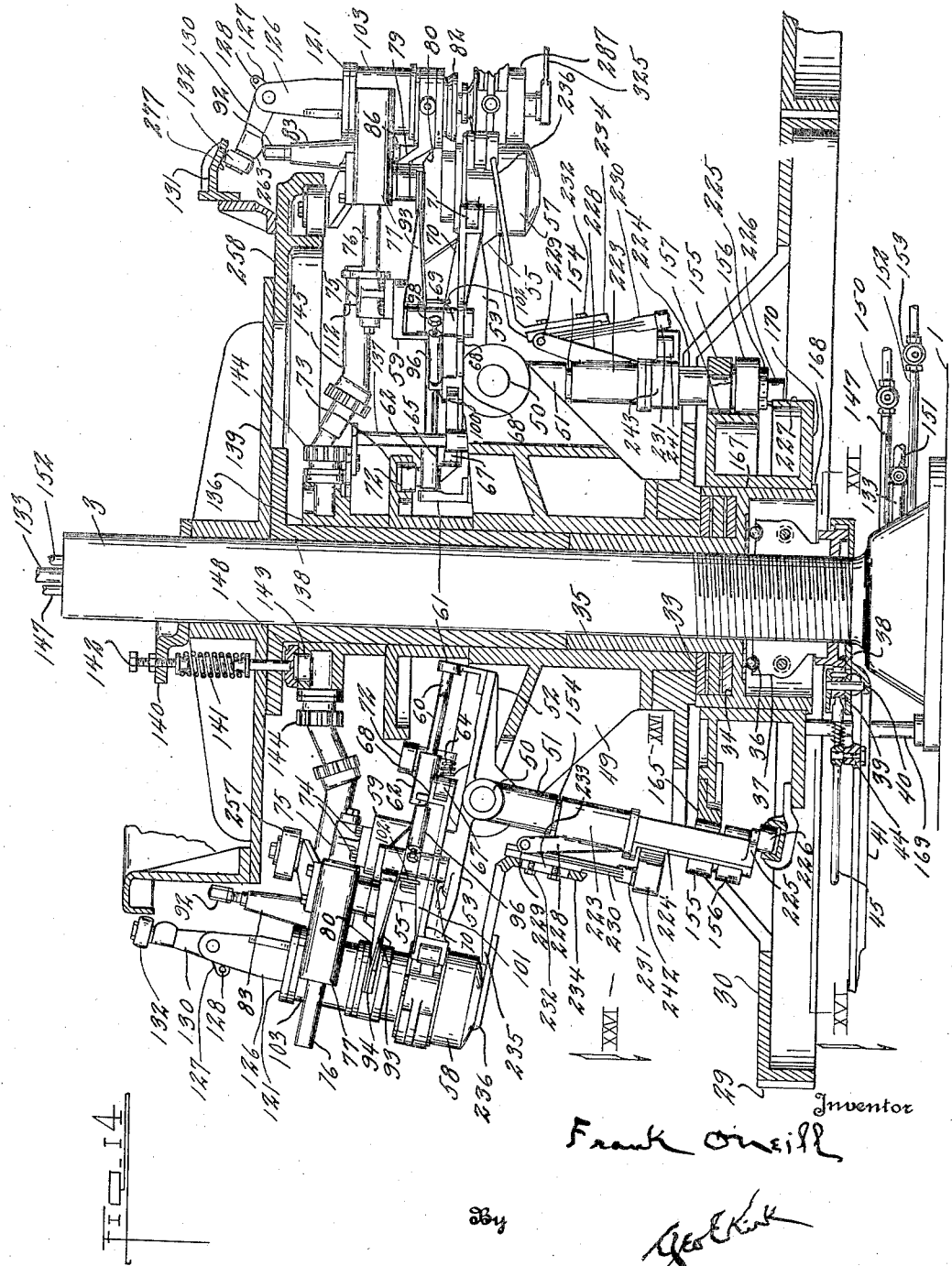

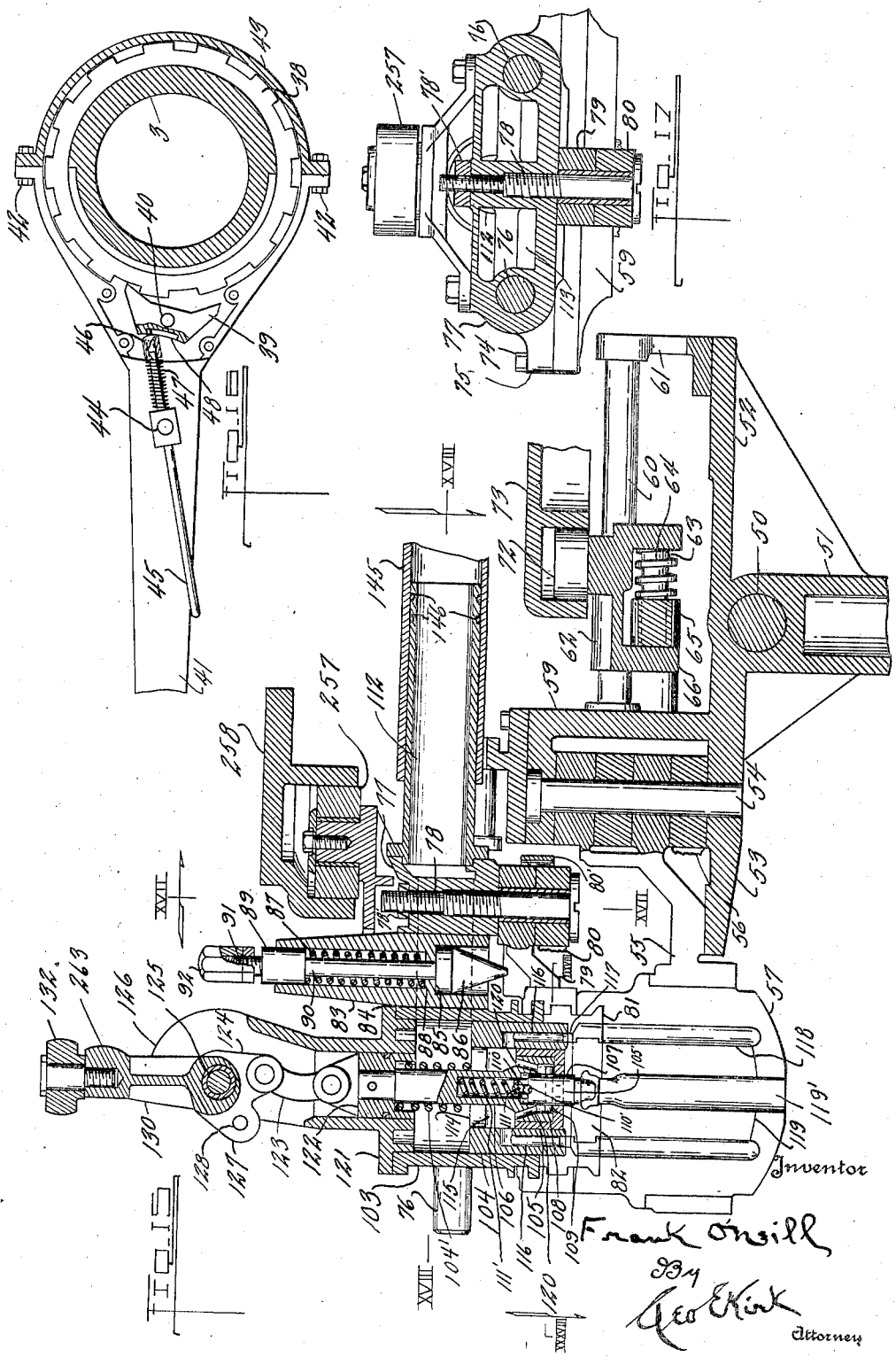

Feb. 28, 1939.  F. O'NEILL  2,148,494
GLASS FORMING MACHINE
Filed April 25, 1929    14 Sheets-Sheet 8
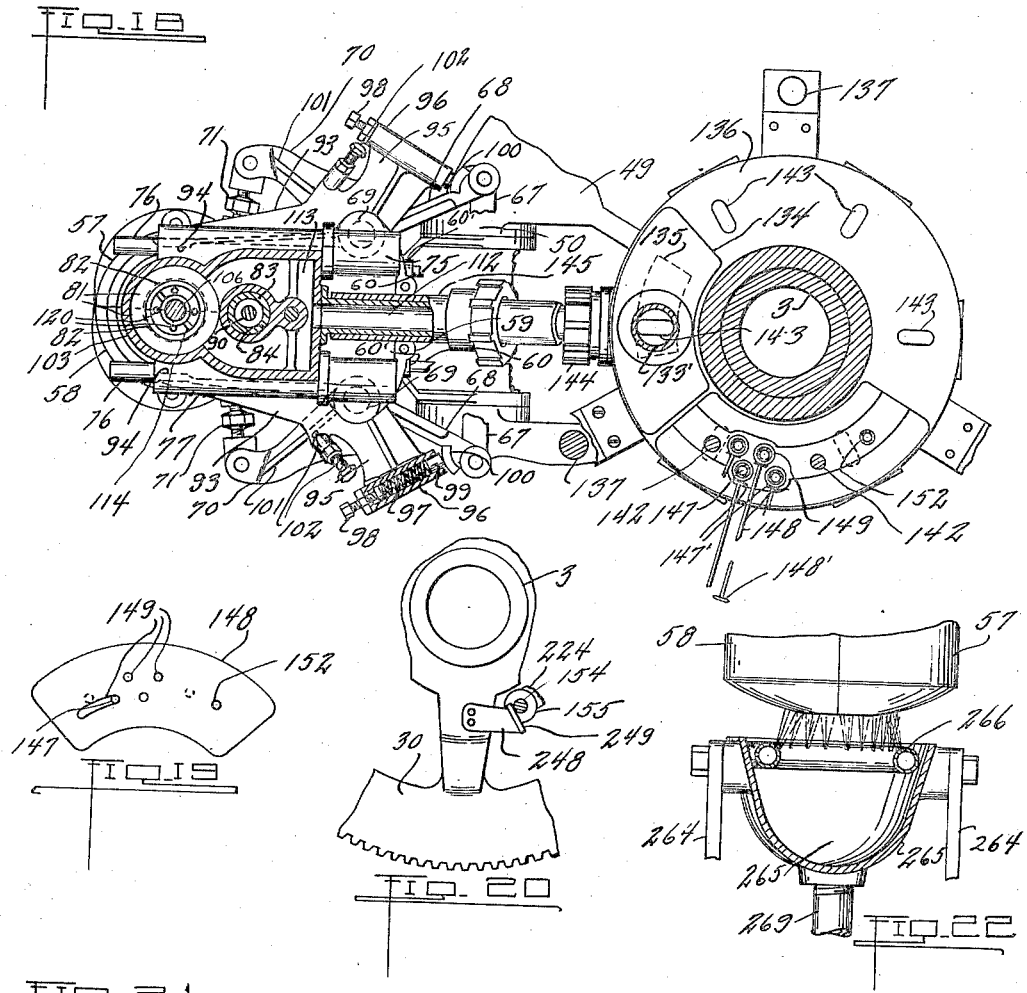
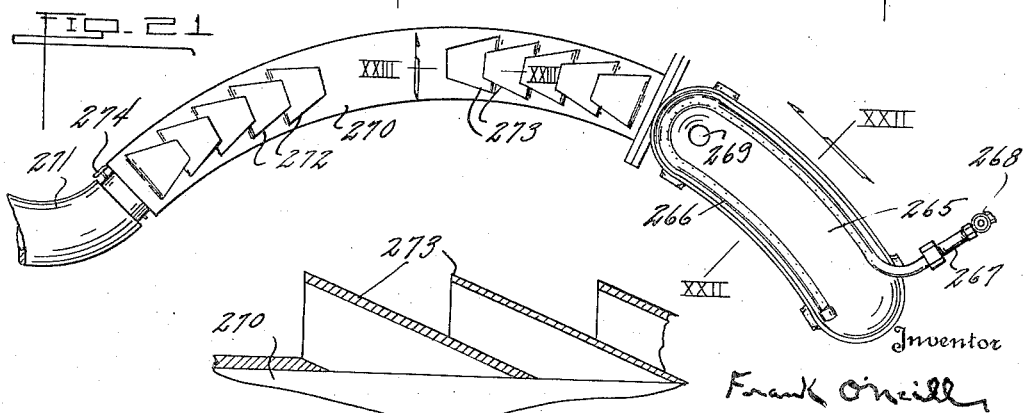
Inventor
Frank O'Neill
By
Geo E Kirk
Attorney Feb. 28, 1939.   F. O'NEILL   2,148,494
GLASS FORMING MACHINE
Filed April 25, 1929   14 Sheets-Sheet 9
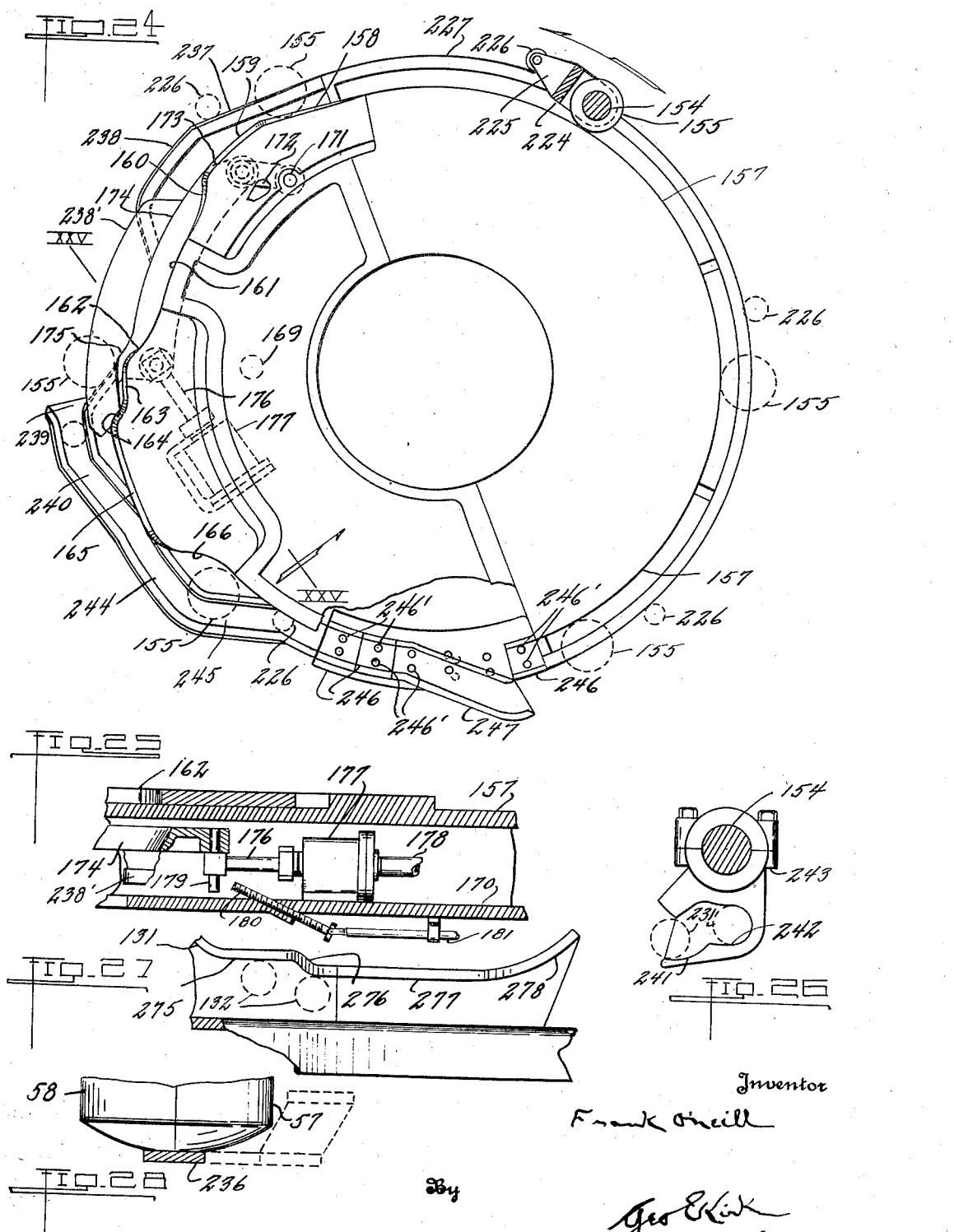

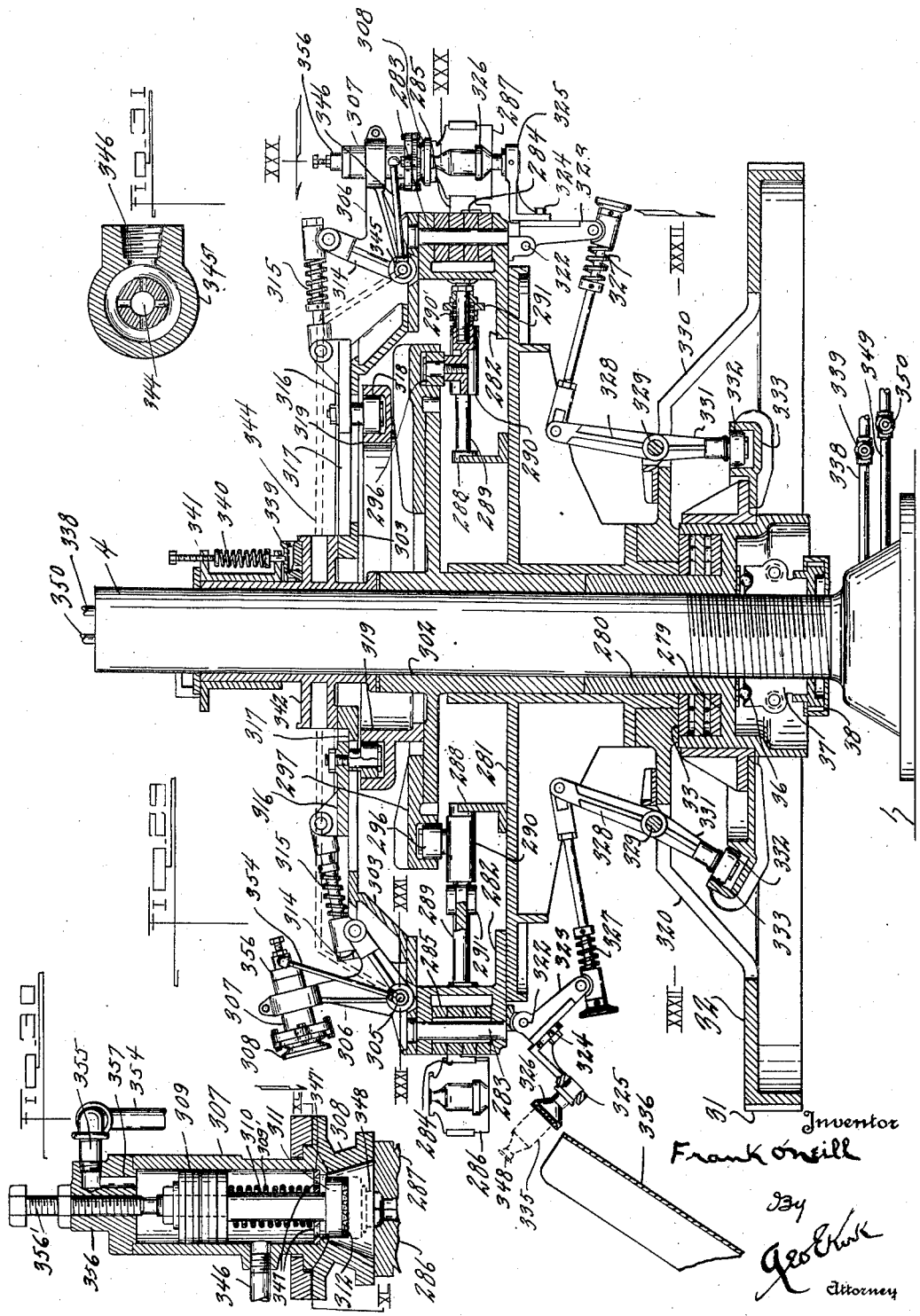

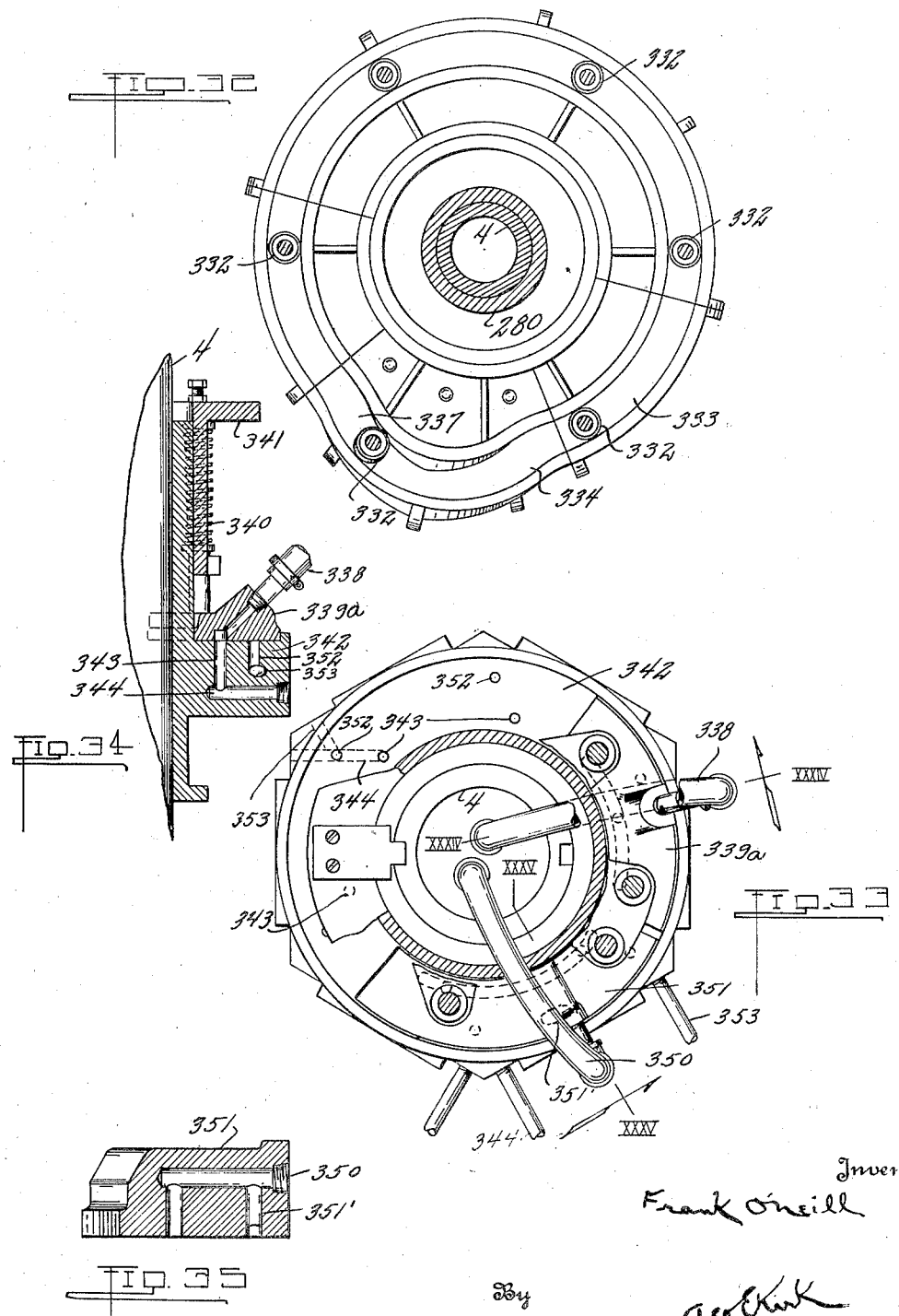

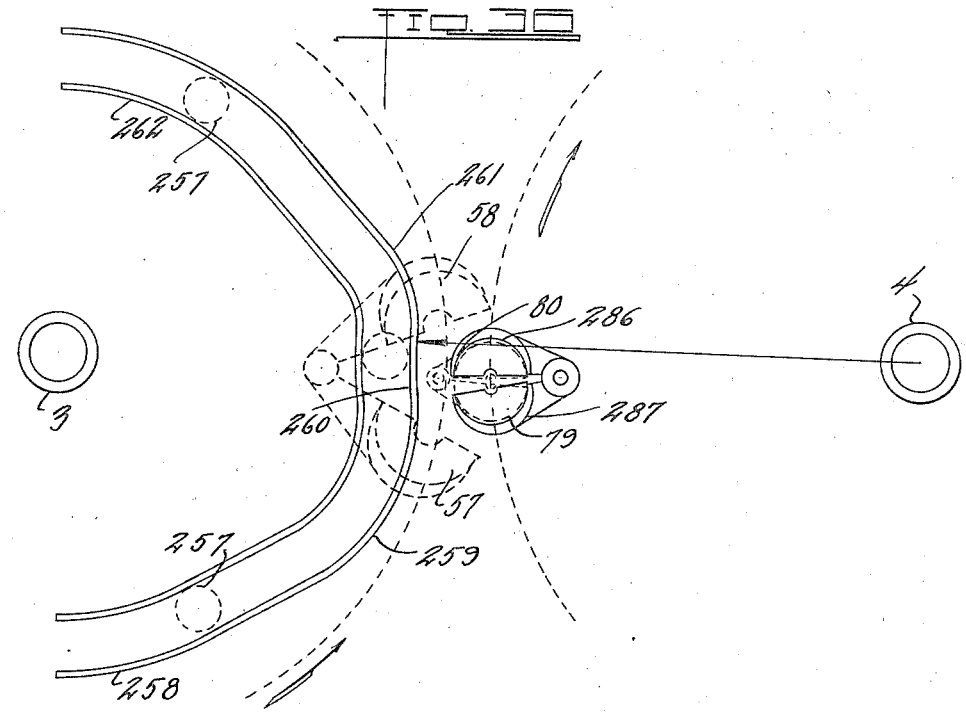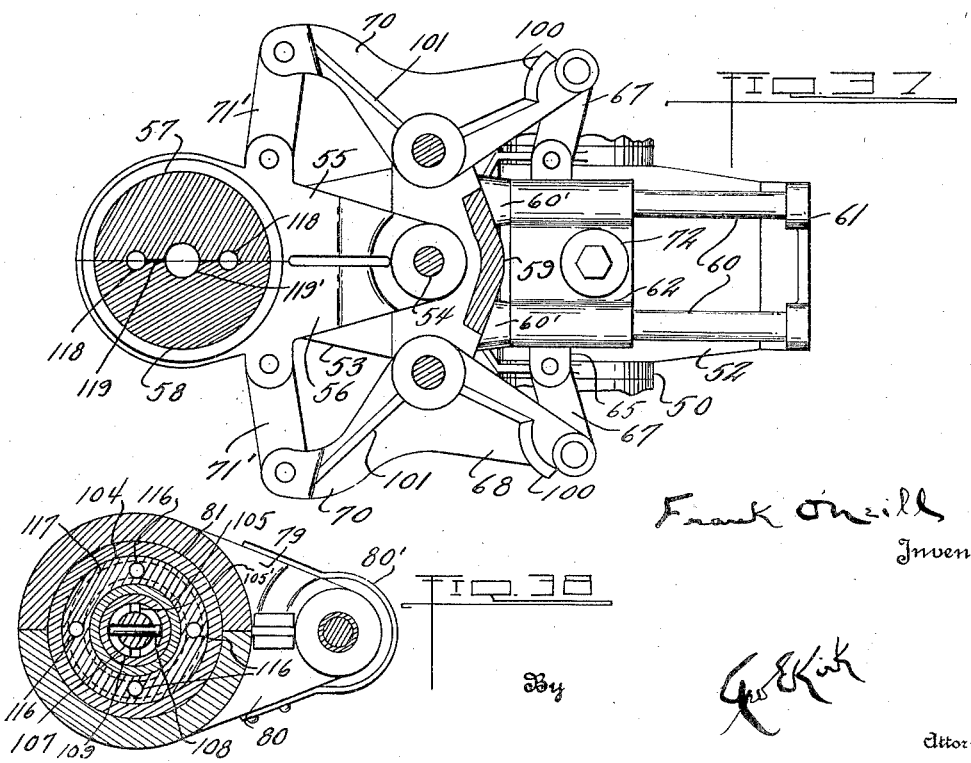

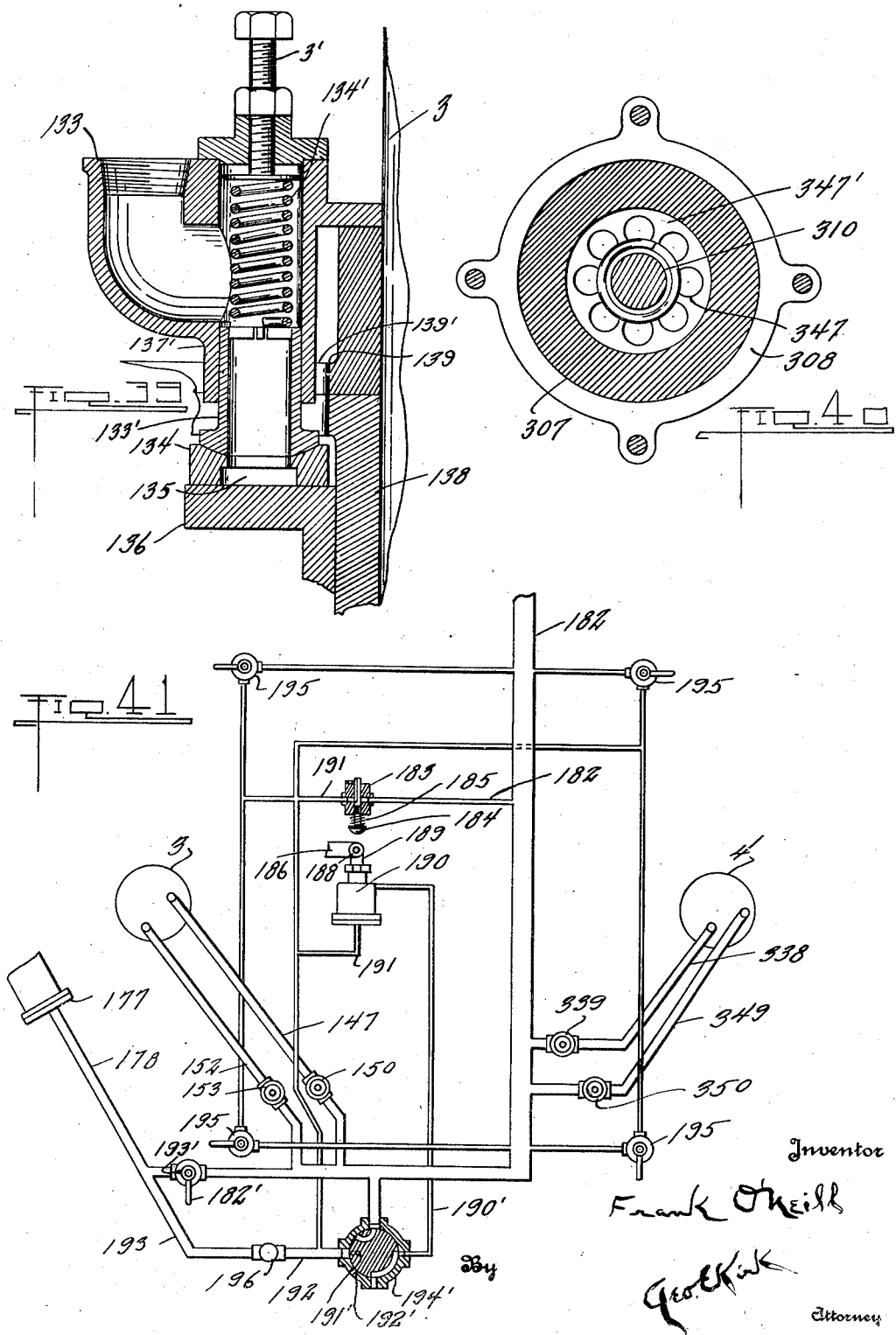

Feb. 28, 1939.　　　　F. O'NEILL　　　　2,148,494
GLASS FORMING MACHINE
Filed April 25, 1929　　　14 Sheets-Sheet 14
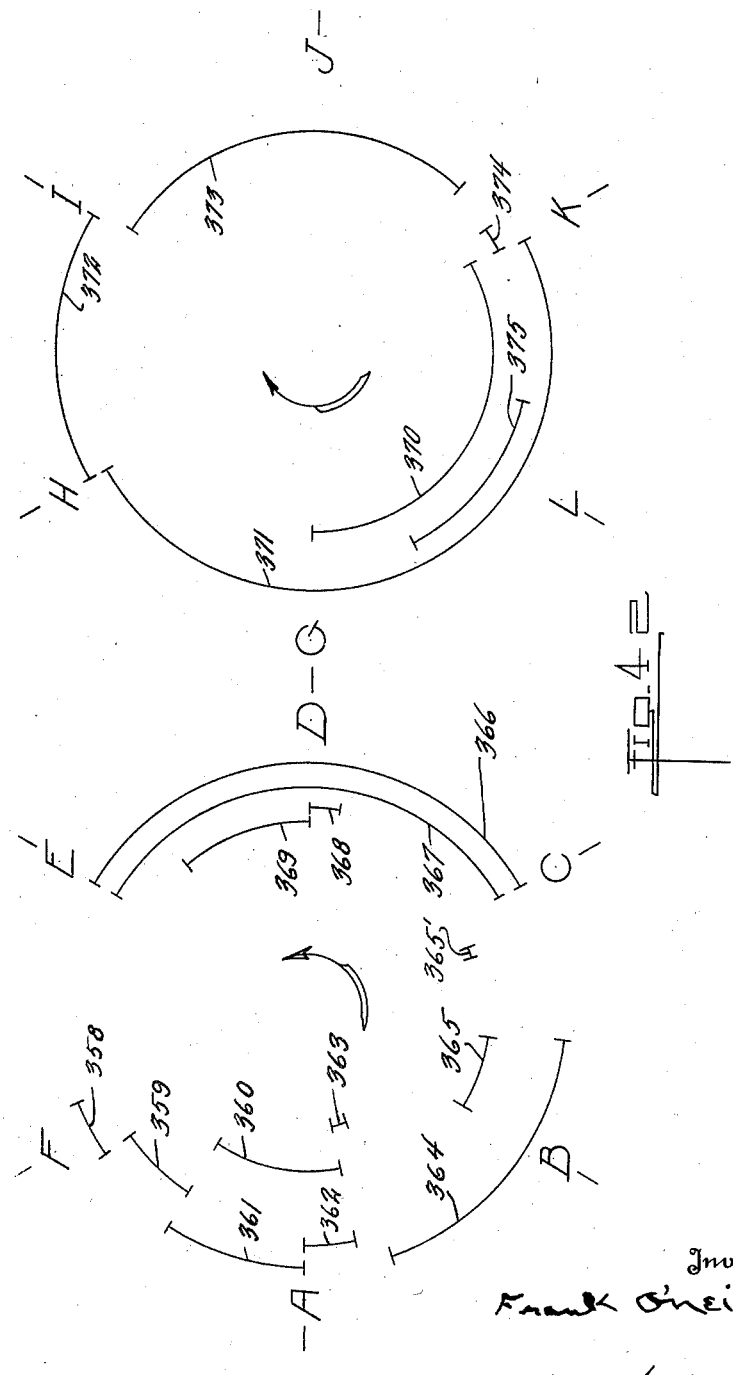

Patented Feb. 28, 1939

2,148,494

UNITED STATES PATENT OFFICE 2,148,494

GLASS FORMING MACHINE

Frank O'Neill, Toledo, Ohio, assignor, by mesne assignments, to Owens-Illinois Glass Company, Toledo, Ohio, a corporation of Ohio Application April 25, 1929, Serial No. 357,986

16 Claims. (Cl. 49—5)

This invention relates to the production of formed articles from molten material.

This invention has utility when incorporated in the manufacture of hollow glassware, and as here illustrated, involving a portable base having a drive thereon for a pair of rotary tables directly inter-engaging for thereby maintaining nicety for coaction in the sequence of operations therebetween. The pair of tables on their columns are located for ready adjustment so that different conditions may be met as to the ware size to be handled as well as to the source of molten glass supply.

The first or blank mold table has thereon sectional blank molds mounted on a rockable device as to the table. This blank mold in the production of hollow blown ware as herein disclosed involves a sectional neck finish mold thereover in the annular series of molds for such blank mold table. The blank molds in their opening may not have the neck finish mold follow such opening.

In the continuous operation hereunder, the closed blank molds with the neck finish molds thereover may effect therethrough a suction gather of molten glass thereinto with packing of such molten glass to fill the blank mold due to pneumatic connections from the machine. This suction gather occurs by dipping the blank mold into a pool of molten glass. The normal travel of this rockable mounting for the blank mold is in approximately horizontal position for the mold, with a lift of the mold up as approaching the source of molten glass; then dropping to the approximately horizontal position of a suction gather from the pool of the molten glass; and then the lifting up out of the pool.

In practice, conditions frequently arise for checking up the table operation or there may be some matters of mold replacement or even accident in connection with the equipment, making it important to eliminate the dip at the region for suction gather, more particularly that the machine may not stop with a mold in proximity to or in the pool of molten glass. To this end there is provided safety emergency by the cut-out precluding the dip.

In the operation at the continuous speed as herein disclosed, the molten glass supply is at a forebay shallow and of sufficient overhang to permit convenience in locating the machine adjacent thereto. The continuous operation hereunder is effective in the trailing pulling as well as dipping for effecting in its circulation of chilled or objectionable character molten glass away from the gather region.

As the gather is effected and the blank mold is lifted from the pool, shearing of the trailing portion therefrom occurs with the trailing portion dropping back into the forebay. In the continuous travel of this sheared off portion from the suction gather machine, the lower portion of the blank mold is closed by a baffle. The suction gather up into the blank occurs with the plunger at the neck finish portion. This plunger is withdrawn, and with the neck finish still closed, the blank mold may be opened. In continuing its travel, such blank mold may at occasion be given a cooling operation before obtaining a re-supply of glass from the pool.

With the blank mold open and the formed blank suspended from the neck finish, transfer of such to the blow table is effective by increasing the radius of the travel of the blank mold to approximately the radius of the travel of the blow mold on the blow table, at the region of proximity therebetween, with release of the blank as the proximity is approached and the blow mold is closing about the formed blank. As the neck finish is clear of the blow mold, the blow head comes to position over the formed blank in the blow mold, and the blowing operations occur which may be in one or two stages.

The travel on the blank table as herein disclosed is counter-clockwise, while this travel continuously therefrom on the blow table of the ware in its formation is clockwise.

The blow mold comprises a pair of upright sections and a bottom. The bottom is held in the blow mold when the upright sections are closed. When the upright sections are opened, this bottom may be tilted to discharge the blown ware.

The blowing as herein disclosed is shown in two stages, a primary blowing and then a secondary or stretching higher pressure blowing. Additionally, there may be from the air supply, a pneumatic holding of the blown ware in position over the mold bottom as the opening of the blow molds is started, thereby precluding sticking of the ware to either mold and tendency to have the ware get clear of the mold away from center position. With the ware thus held at the mold opening, upon the release of such holding, the tilting of the bottom insures the uniformly directing of the blown ware discharge.

Referring to the drawings:

Fig. 1 is a fragmentary plan view of the gather and blank forming portions of the machine embodying the invention hereunder;

Fig. 2 is a fragmentary plan view of the blow table, which as viewed with Fig. 1, comprises the full plan of the machine;

Fig. 3 is a plan view of the truck or base and drive for the tables of Figs. 1 and 2 thereon;

Fig. 4 is a detail view on an enlarged scale, on the line IV—IV, Fig. 3, looking in the direction of the arrow;

Fig. 5 is a section on the line V—V, Fig. 1, looking in the direction of the arrow;

Fig. 6 is a section on the line VI—VI, Fig. 1, looking in the direction of the arrow;

Fig. 7 is a section on the line VII—VII, Fig. 6, looking in the direction of the arrow;

Fig. 8 is a section on the line VIII—VIII, Fig. 7, looking in the direction of the arrow;

Fig. 9 is a fragmentary view of the shear mounting from the line IX—IX, Fig. 1;

Fig. 10 is a fragmentary view of the upper bracket portion of the shear mounting of Fig. 9, parts being broken away;

Fig. 11 is a plan view of the shear of Fig 10;

Fig. 12 is a fragmentary view of the top portion of the water cooled holding plate for the shear proper;

Fig. 13 is a section on the line XIII—XIII, Fig. 11, looking in the direction of the arrow;

Fig. 14 is a section on the line XIV—XIV, Fig. 1, looking in the direction of the arrow;

Fig. 15 is a section through the blank mold unit 90° after the transfer;

Fig. 16 is a section on the line XVI—XVI, Fig. 14, looking in the direction of the arrow;

Fig. 17 is a section on the line XVII—XVII, Fig. 15, looking in the direction of the arrow;

Fig. 18 is a section on the line XVIII—XVIII, Fig. 15, looking in the direction of the arrow;

Fig. 19 is a detail view in bottom plan of a pad for pneumatic connection at the blank table column;

Fig. 20 is a fragmentary detail view of the bumper or vibration take up device for the lower stem of the blank mold rocker unit;

Fig. 21 is a fragmentary plan view of the blank mold cooling device;

Fig. 22 is a section on the line XXII—XXII, Fig. 21, looking in the direction of the arrow;

Fig. 23 is a section on the line XXIII—XXIII, Fig. 21, looking in the direction of the arrow;

Fig. 24 is a plan of the blank mold unit rocker control cam and dip cut-out;

Fig. 25 is a section on the line XXV—XXV, Fig. 24, looking in the direction of the arrow;

Fig. 26 is a partial section on the line XXVI—XXVI, Fig. 14, looking in the direction of the arrow;

Fig. 27 is a fragmentary detail view from the right in Fig. 1, looking into the cam as controlling the cracking or opening of the neck finish;

Fig. 28 is a fragmentary view as the blank mold is past the shearing, showing in dotted lines the line of travel of the baffle into position under the sheared off gather in the blank mold;

Fig. 29 is a section on the line XXIX—XXIX, Fig. 2, looking in the direction of the arrow;

Fig. 30 is a section on the line XXX—XXX, Fig. 29, looking in the direction of the arrow;

Fig. 31 is a partial section on the line XXXI—XXXI, Figs. 2, 29 looking in the direction of the arrow;

Fig. 32 is a section on the line XXXII—XXXII, Fig. 29, showing the blow mold bottom control cam;

Fig. 33 is a fragmentary view of the pneumatic supply connections to the blow mold table;

Fig. 34 is a section on the line XXXIV—XXXIV, Fig. 33, looking in the direction of the arrow;

Fig. 35 is a section on the line XXXV—XXXV, Fig. 33, looking in the direction of the arrow;

Fig. 36 is a diagrammatic showing of the table radii relations at the transfer;

Fig. 37 is a fragmentary plan view showing the automatic locked position of the blank mold;

Fig. 38 is a section on the line XXXVIII—XXXVIII, Fig. 15, showing portions of the neck finish connection;

Fig. 39 is a section on the line XXXIX—XXXIX, Fig. 1, showing features of the suction duct;

Fig. 40 is a section on the line XL—XL, Fig. 30, showing details of the finish blow head;

Fig. 41 shows features of pneumatic control; and

Fig. 42 is a diagrammatic showing of the sequence of operations.

The drive

A two-table suction type of hollow or blown glass forming machine of the disclosure is herein shown as mounted on base 1 (Fig. 3) having rollers 2 permitting shifting of such base into various positions with the machine thereon. Rising from this deck or base 1 is blank table or carrier column 3 and blow table or carrier column 4. Also mounted on this base 1 is electric motor 5 having shaft 6 carrying sprocket wheel 7 with sprocket chain 8 therefrom to sprocket wheel 9 on shaft 10 mounted in bearings 11, 12.

The shaft 10 extends to have splined thereon collar 13 having clutch face depressions 14 opposing clutch wedge shaped projections 15 on companion clutch member 16 fixed with shaft 17 carrying worm 18 in housing 19 providing bearings 20, 21, for this shaft 17 in alignment with the shaft 10. The clutch collar 13 is normally thrust by compression helical spring 22 into holding engagement with the clutch member 16 due to this spring 22 reacting against threaded nut 23. The nut 23 (Fig. 4) may be adjusted along the threaded portion of the shaft 10 to vary the compression holding action of the spring 22 for the clutch 14, 15. The nut 23 when adjusted may be held against shifting by set screw device 23'. Instead of being continuously driven from the motor 5, the shaft 17 may be operated on occasion by hand wheel 24, as for a desired positioning of the tables.

The worm 18 is in mesh with worm gear 25 loose on fixed shaft 26 rising from the base 1. Housing 27 is provided for the worm gear 25 and gear 28, fast with the gear 25. The gear 28 is in mesh with peripheral toothed portion 29 of blank table or carrier 30. This peripheral toothed portion 29 of the blank table carrier 30 is directly in mesh with similar diameter toothed portion 31 of blow table or carrier 32. There is, accordingly, in the operation hereunder, a continuous rotation of the blank table counterclockwise and the blow table clockwise at the same angular velocity.

Table mountings and adjustment

The blank table or carrier 30 is located at the column 3 (Fig. 14), on antifriction bearings 33 sustained by ledge 34 fixed with sleeve 35 on the column 3. This ledge 34 below the antifriction bearing 33 has antifriction bearing 36 carried by split nut 37 coacting with externally threaded portion of the tubular column 3. The nut 37 is readily replaced.

This nut 37 has fixed therewith ratchet wheel 38 (Fig. 16) engageable by rockable pawl 39 mounted on pivot 40 of oscillatable radially extending operating handle 41 assembled by bolts 42 with companion member 43 as a ring yoke axially sustained by engaging about the projecting teeth of the ratchet 38. Mounted on pivot pin 44 of the operating handle 41 is control rod 45 extending to have tip 46 yieldably thrown by compression helical spring 47 into holding engagement with seat 48 in the pawl 39. With this rod 45 rocked one way the pawl 39 may coact as the arm 41 is oscillated to effect rotation of the nut 37 clockwise in working down on the column, thereby to lower the table 30, while shifting of the rod 45 in the opposite direction causes this intermittent grip device to effect the reverse or lifting travel of the table 30. The arm 31 may extend outwardly so that it may be conveniently grasped by the one desiring to effect table adjustment, and this adjustment may occur even during table rotation.

*Blank mold mountings*

Rising from the table 30 is spider 49 providing fulcrum bearings 50 herein shown as six in number in a six arm table (Figs. 14, 18). In each of these bearings or fulcra 50 is a T-shaped rocking member having depending stem portion 51 and inwardly extending short cross portion 52 and an outwardly extending longer cross portion 53 (Figs. 14, 15). The portion 53 has fixed therein pin 54 as a hinge pin for arms 55, 56, carrying blank mold sections 57, 58.

Rising from this crossover portion 53 is bracket 59 rearwardly from which extends pair of guide rods 60 to bracket 61 at the inner terminus of the cross portion 52 of this rocker blank mold-carrier unit. Mounted on the guide rods 60 is slide 62 having auxiliary rod 63 with compression helical spring buffer 64 normally holding crosshead 65 toward ledge 66. This crosshead 65 is connected by links 67 to arms 68 (Fig. 18) mounted on fixed fulcrum pins 69 carried by the bracket 59.

Fixed with these arms 68 and at an angle thereto are arms 70 having adjustable link connections 71 with the arms 55, 56. It accordingly follows that as the slide 62 is shifted radially upon the guide rods 60 by roller 72 (Figs. 14, 15) coacting with cam 73, there is, in the positive inward travel, an opening of the blank molds 57, 58, while in the outward travel there is yieldable actuation due to the transmission through the buffer spring 64 in the swinging of the blank mold sections 57, 58, into toggle held locked closed position at stop 60'. While it is preferred to have adjustable link 71, non-adjustable links 71' may be used (Fig. 37).

*Neck finish mountings*

Mounted on the bracket 59 by bolts 74 (Figs. 1, 14, 15, 18) is auxiliary bracket 75 having fixedly mounted therewith a pair of outwardly extending guide rods 76 (Figs. 1, 14, 15, 17, 18). Crosshead member 77 is mounted on these guide rods 76. The member 77 at the inner side has fixed therein hinge pin 78 locked in adjusted position by nut 78'. The pin 78 depends from the member 77 to provide bearings for arms 79, 80, normally held toward closed position by spring 80' (Fig. 38), mounting block sections 81 in opposing relation to carry the pair of neck finish mold sections 82.

Radially outward from and adjacent to the neck finish mold section bearing pin 78 (Figs. 15, 18) is tubular extension 83 fixed in opening 84 of the crosshead 77. This tubular extension has shoulder 85 against which is held wedge 86 by spring 87 coacting with ledge 88 opposite the shoulder 85 and between such ledge 88 and collar 89 on stem 90 fixed with the wedge 86. Upwardly protruding from this tubular extension 83, the stem 90 has threaded portion 91 on which may be adjusted nut 92 to take care of different wear conditions.

Depression of this stem 90 by thrusting such downward against the resistance of the compression helical spring 87 thrusts the wedge 86 between the arms 79, 80, and thereby tends to throw these arms away from each other in opening the neck finish mold sections 82 against the resistance of spring 80'.

*Retarding neck finish opening*

The fulcrum bearing pins 69 in the crosshead 77 adjacent the region of the pin 78 have mounted thereon arms 93 (Fig. 18) terminating at their free ends in cheeks 94 abutting the free ends of the arms 79, 80. Fixed with the arms 93 (Figs. 14, 18) are shorter arms 95 having guides 96 in which are disposed compression helical springs 97, the compression action of which may be adjusted by bolts 98. These guides 96 have inwardly directed open ends in which are disposed plungers 99 abutting against guides 100 in the vicinity of the connection of the links 67 with the arms 68 and on said arms. The arms 70 are provided with ledges 101 with which may coact adjustable pins 102 fixed with the arms 93, 95. It accordingly follows that with the blank mold sections 57, 58, in closed position, the neck finish mold sections 82 are yieldably held in closed position by the cheeks 94 of the arms 93, 95, in addition to the action of the relatively weaker spring 80'. When the blank molds are closed, the upper portions thereof as embracing the neck finish mold sections serve positively to keep the neck finish mold sections closed.

As the blank mold sections 57, 58, open, the arms 93 hold the neck finish mold sections 82 from opening therewith. However, after a short distance of opening or loosening movement of the blank mold sections, the neck mold sections are released due to the fact that the ledges 101 act on the pins 102 to swing the arms 93 clear of the neck finish mold section arms. This leaves the neck finish mold sections in closed position so that upon the descent of the wedge 86, there is no resistance to the opening of the neck finish mold sections, other than the spring 80'.

As the pressure on the plunger 90 is released and the spring 87 lifts the wedge 86, the neck finish mold sections 82 are closed by the leaf spring 80' before the blank mold sections swing toward closed position. However, this cooperation between the blank mold sections and the neck mold sections for closing and opening only occurs with the crosshead 77 in the radial inward or retracted position, for this crosshead 77 is slidable radially outward on the slides 76 to have the neck finish mold sections 82 clear the region of the open blank mold sections 57, 58.

*Suction gather*

This crosshead member 77, radially outward from the guide extension 83, has a vertical cylinder portion 103 (Fig. 15). This cylinder 103 has sleeve 104 held against block 81 by spring 104'. In this sleeve is piston 105 fixed with stem or piston rod 106, which stem 106 is assembled with neck finish inner plug or plunger 107 to have pin 108 in chamber 109 and pin 110, after entering way 105' and then angularly shifted, to seat in notch 110' in the upper end of the plunger 107 at slot 111 as there held by spring 111'. Pin 108 holds the plunger 107 from dropping away from the piston 105. The spring 111' permits plunger adjustment for varying glass or mold conditions.

Upon suction in duct 112, (Figs. 15, 18) such is effective through the member 77 by passage 113 to the cylinder 103 thence through spider 114 to chamber 115 above the piston and by way of lateral ports 116 and channel 117 into ways 118 having mold section joint crack clearance or relieved region 119 into the region 119' of the blank mold. This suction is also effective through ports 120 at the chamber 115.

The cylinder 103 is provided with head 121 serving as a guide for block 122 connected by link 123 to arm 124 on pivot pin 125 carried between a pair of upstanding ears 126 from the head 121. Fixed with the arm 124 is minor arm 127 carrying pin 128 acting against one of the ears 126 as a stop, permitting swinging of the arm 124 outwardly to an open position for the piston 105, as to the ports 116.

*Packing blow*

Rocking of this arm 130 clockwise (Fig. 15) say by the action of cam 131 (Figs. 1, 14) upon roller 132, causes the piston 105 to be lifted sufficiently to close the ports 116 so that pressure air through the duct 112 into the cylinder 103 may flow only by passages 120 and past the plug 107 into the blank as in the blank mold.

*Pneumatic connections*

There is provided suction air line 133 (Fig. 39) extending through duct section 133' to relatively rockable block or pad 134 maintained sealed by spring 134' as adjusted by bolt 3'. The pad 134 has chamber 135 therein toward plate 136 directed by guide 137' for the spring 134' and duct section 133' rising through opening 139' in the deck 139. Guide rod 137 rises from the spider 49 so that this plate 136 may be engaged thereby to rotate with the table or carrier. Sleeve 138 is about the column 3 and carries deck 139. The degree of suction in the line 133 may be regulated by valve 151 (Fig. 14).

The plate 136 has ports 143 in communication through universal knuckle 144 with pipe link 145 as a telescopic outer sleeve section connecting to the duct 112. The telescopic joint (Fig. 15) is packed by piston rings 146. There is accordingly provision, from this ring plate 136, anchored to rotate about the column 3, for the mold carrying rockable unit to oscillate as well as have this duct connection to the cylinder 103 even in the thrusting of such outward with the neck finish.

Additionally, through the column 3 is pressure air supply line 147 (Figs. 1, 14, 18, 19) to block or pad 148 terminating in ports 149 to register with the plate ports 143 for an adjustable interval of high pressure puff or blowing action as regulated by pet cocks or cut off valves 147' having extension handles 148'. Valve 150 in the line 147 may cut off or check the pressure air volume. Additionally, there extends to the pad 148 duct 152, the flow through which may be regulated by valve 153. This duct 152 may be regulated for merely a minor puff, while the major blow is for packing of the gather into the blank mold.

This final puff desirably may be after the blank mold is open and the neck finish plug withdrawn to effect a redistribution of the glass or stretching of the blank from the neck. In practice, this may occur just as the blank molds 57, 58, are opened, although it may occur either before or after such opening. This pad 148 is held in contact with the plate 136 by helical springs 141 coacting from brackets 140. The compression of the spring 141 may be adjusted by bolts 142.

*Dip control for blank mold*

The T-unit depending arm or stem 51 has bearing extension 154 upon the lower portion of which is mounted rollers 155, 156. The roller 155 (Figs. 14, 24) coacts with cam 157 in the major travel range wherein the cross portion of the T approximates horizontal position. In this rotation direction counter-clockwise (Fig. 24) the roller 155 rides out on cam 158 and may be maintained for a distance by cam 159 at a degree of tilt to clear the forebay, and then has a drop portion 160 with region 161 approximating the horizontal position holding of the cam portion 157. Thereafter, there is another rise portion 162 to clear the pool; a brief maintained portion 163 for shearing; and additional rise or lift portion 164 to clear the shear; maintaining portion 165 for bottom closing of the gather mold, and drop back portion 166 to the cam 157.

The roller 156 is normally effective in a minor arc region and as herein disclosed has coaction for determining the dip into the tank for the suction gather. The cam portion 157 is mounted about the bearing 33 on sleeve 167 (Fig. 14) having lower flange 168 maintaining axial position for the cam 157 as to the table 30. This cam 157 is held from rotation as to the column 3 by upstanding rod 169 loosely therethrough. Fixed with this cam 157 is lower web 170 (Figs. 14, 25). Between the web 170 and cam 157 is pivot pin 171 mounting link 172 (Fig. 24) carrying minor arc bridge cam having entrance face 173 for the roller 156. From this outward extending portion 173 there is the major bridge portion 174 as the suction gather region, terminating in outwardly extending portion 175 adjacent to which is connected piston rod 176 from cylinder 177 having air line connection 178 for approximating parallel motion shifting of the cam.

Mounted on the web 170, adjacent pin 179 as the connection between the piston rod 171 and the shiftable bridge cam section, there is adjusting screw 180 having extension rod operating connection 181. The screw 180 serves as an abutment to limit the inward shifting of this bridge cam 174 thereby determining the maximum depression or dip for the suction blank molds.

*Safety cut out for the dip*

Power air line 182 (Figs. 3, 41) has valve 183 in which is plunger 184 normally thrust outward therefrom by helical compression spring 185. Engaging the grooved collar 13 is lever 186 having fixed fulcrum 187 and free end 188 with which may coact piston rod 189 from cylinder 190. As the load on either table 30 or 32 becomes excessive due to strain or clogging or other interference, the adjustably set clutch faces 14, 15, slip or snap free, thereby swinging the arm 186 on its fulcrum 187 away from the clutch member 16. This tends to depress the plunger 184, opening the valve 183 so that power air may flow from the line 182, thence by line 191 into the cylinder 190 and thereby cause the piston rod 189 to hold the power shaft 10 unclutched from the driven worm 18. This line 191 has branch 192 extending to line 193 having connection to line 178, which is thereby effective at the cylinder 177 for thrusting the cam section 174 outward to cut out any dip of the suction gather blank molds, thus precluding any freezing or holding of the blank mold in or toward the molten glass.

Independently of this automatic safety stop there may be manual shutting off of the power air at valve 194' shown in off position in Fig. 41. However, with the valve 194' open, a shifting of the valve 194' counterclockwise 90° is a manual throwing in for power resetting of the machine for operation. Port 192' in the valve 194' is now effective to release the compressed air in the line 192 so the machine may be re-started. A shifting 90° further counterclockwise of this valve 194' is power cut-out for the machine and the dip with the cylinder 190 exhausting through line 190' and port 191' of the valve 194' as now in position 180° from the showing in Fig. 41. The full shut off of power air may be at valve 194. Manually operable emergency valves 195 are variously located about the machine so that the operator may connect the power line 182 with the line 193 in determining cutting out of the dip by admission of power air to the cylinder 177. In the event it be desired to stop the machine, switch 5' or valve 194' is thrown to off position. Valve 182' as in off position has slow vent 193' for the line 178.

One way valve 196 in the line 192 precludes flow of the power air from the line 193 to the cylinder 190. It is thus seen that when the machine is automatically stopped there is no gather dip for the mold and that at any emergency valve opening the machine continues to run and only the mold dip is cut out.

*Molten glass supply*

In carrying out the invention herein, molten glass tank having cylindrical upwardly extending side walls 197 (Figs. 1, 5) rise to contain pool of molten glass having upper surface 198. This molten glass tank as a fixed structure is shown having in its wall 197 lateral opening 199 (Figs. 5, 6,) relatively shallow as to the width of such opening along the side of the tank or in the wall 197. This opening is but slightly above the surface 198 of the molten glass as to its upper portion. There is over the surface of glass a minor or close clearance determined by refractory flat arch 200. From the clearance region below such arch 200 and from slightly below the lower portion of the opening 199 is refractory overhang 201 with retaining metallic shell 202 therefor. This refractory is of minor thickness as to the arch as well as the tank wall and its width from the wall 197 is of minor extent relatively to its length along such wall. This permits practical clearance for the blank table gear 29 therebelow with convenient location for the machine. There is provided outwardly from the arch an exposed region for the surface 198 within the refractory 201 of the forebay rising slightly above the surface 198 of the pool of molten glass. This open region is further restricted by metallic refractory of a character against contaminating the molten glass as nickel chromium alloy plate 203 having arc opening 204 (Figs. 1, 5, 6) therein. This arc opening as concentric with the column 3 and of a radius approximating that of the travel of the blank mold sections 57, 58, in closed position, provides a region for the dip in the suction gather of the molten glass from the pool independently of any stopping in the travel of the machine. The forebay deepens toward the pool for ready return of chilled residues to the higher temperature molten mass of the tank proper.

The blank mold sections 57, 58, in the continuous operation of the machine have a lineal velocity such that the dip down to the surface of the pool 198 occurs with suction effective at the contact instant so that the full suction effect is that of glass drawn into the blank mold, during the travel of the blank mold 57, 58, as just contacting or very slightly immersed into the surface 198 of the pool of molten glass.

Before the mid-point of the opening 204 in the plate 203, the lift of the blank mold may be started with the major portion of the latter path of travel being with the blank mold 57, 58, clear of the glass surface 198. The relative travel rate of the blank mold 57, 58, with the gather therein is such that trailing portion 205 (Figs. 6, 7, 8) from the gather, even though the bottom opening from the blank mold 57, 58, be of circular cross section, produces in this trailing region 205, a reduced cross section in the direction of the relative travel. This flattening out of the tail or trailing portion is along the surface of the glass 198 and just clear of the end of the opening 204. Notched or V-shaped shear blade 206 is effective by rubbing over the lower portion of the closed blank mold 57, 58, to sever this trailing portion 205 to fall upon the surface of the pool 198 as a raised portion 207. The repetition of this cycle of gathering operations is of such sequence frequency that this building up of the region 207, together with the dragging from the pool of trailing portions 205 theretoward, cooperate in this shallow narrow forebay as an automatic circulator for the molten glass in keeping a clear molten region exposed at the entrance portion of the opening 204 for the succeeding suction gathers.

The gradually increasing depth toward the pool in the tank from this forebay, together with the increase in depth inward from the region 207 and the pull thereupon of the trailing portion 205, variously cooperate in the automatic removal of the lower temperature chilled portions 205, 207, for settling or circulating back into the pool.

In glass manufacture operations hereunder, there is conveniently a speed of gather so effective in this circulation with such a degree of fluidity in the glass for the gather that special heating or burners may not be found necessary during the operations, although resort thereto may be desirable in opening up the forebay before starting a machine. In fact, in starting up the machine hereunder, such may be accomplished in as few as seven minutes from the machine cold, by taking off a refractory closure over the forebay when the tank is up to temperature, the placing of this shield 203 in position and then starting up the machine hereunder. This shield eliminates objectionable chill and oxidation at the forebay and protects the machine from excessive heat.

*The shear*

In the vicinity of the leaving of the pool forebay by the blank in the suction gathering operation, there is located the shear 206. Mounted on the base or platform 1 (Figs. 1, 9) is bracket 208 rising to carry auxiliary bracket 209 mounting fulcrum bearing 210 (Fig. 10). This bearing 210 has depending arm 211 having keyed engagement near head 212 with rod 213 which extends from the notch in the arm 211 through the auxiliary bracket 209. The shear 206 is given a yieldable adjustment by rotating knurled nut 214, thus axially shifting the rod 213 to rock the arm 211. The nut 214 is held against the auxiliary bracket 209 by helical compression spring 215 surrounding the rod 213. The arm 211 has horizontal angle extension 216 carrying block or plate 217 terminally of which is mounted the V-shaped cutting blade or shear 206. This plate 217 has ways 218 therein and water circulating supply duct 219 (Figs. 11, 12) may connect to such duct on one side with water discharge duct 220 on the other side for completing this cooling circuit to keep the temperature of the shear 206 lowered. This arm 211 has the assembly of the water cooled plate 217 therewith adjustably effected by set screws 221 (Figs. 10, 11, 13). Valve 222 (Fig. 1) controls the flow of the water supply in the line 219 to water cool the shear.

Baffle

The depending bearing stem 154 (Figs. 14, 24) has sleeve 223 thereon above the rollers 155, 156, with U-shaped bracket 224 fixed with the sleeve portion 223 and spanning the rollers 155, 156, therebelow to have arm 225 extending forwardly from the depending stem 51, 154, to carry roller 226 in coacting with cam 227 below the cam 157. This sleeve 223 has upstanding therefrom bracket 228 providing fulcrum bearing 229 for depending arm 230 carrying roller 231. Bolts 232 on this arm 230 below the bearing 229 coact with slot 233 for adjustably anchoring angular offset 234 of radially extending arm 235, terminally carrying plate 236 as a baffle or bottom closure for the blank mold as containing the blank therein after the shear operation. The slot adjustment locates the baffle for different molds.

The roller 226 on the arm 225 as leading the depending stem 154 and coacting with the cam 227 holds this bottom closure 236 in trailing position following the blank mold 57, 58, in the major portion of the travel. However, as approaching the suction gather position and in order that the blank mold may rise over the surrounding wall of the forebay 201, there is the slight upward tilt for the arm 53. The roller 226 responds thereto by riding on cam portion 237 from the cam portion 227 (Fig. 24). During the travel of roller 155 over the cam 158, the roller 226 may travel on cam way 238 and across the forebay on cam 238' fixed with the bridge cam 174. The roller 226 then enters cam way 239, to maintain the trailing position for the closure 236 (Fig. 24). Cam portion 240 gives the down-and-under path (Fig. 28) for the closure 236.

This angular swinging of the arm and baffle or plate 236 as to the T-shaped unit 51, 52, 53, effects, in addition to the swing of the closure 236 toward the closure position, a movement of the roller 231 into cam section 241 (Fig. 26) and the riding of such rollers into terminal cam portion 242, there to be held by this different direction cam so that the closure 236 is in snug bottom closing position as to the gather in the blank mold and is there locked for retaining such position.

These cams 241, 242, are in split collar 243 clamped on the depending stem 154 just below the sleeve 223 and in the clearance of the U-yoke 224 above the rollers 155, 156. In this angular position from the closing action of the cam 240 and along the region 244 therefrom (Fig. 24) packing action of the blank gather may occur through the pressure air supply by way of the pipe 147 to the blank mold.

There is tilt of the gathered blank from the horizontal position at the gather in the tank up over the forebay wall 202 in leaving the tank, and then into approximately horizontal position for the unit arms 52, 53. The closure 236 is in the position for this packing blow, for the roller 226 travels in cam way 245 and for a distance therealong in independently insertable cam way sections 246 for an adjustable distance and does not interfere with the maintenance of the closed position for the baffle 236. Thereafter, as this packing operation is completed, cam portion 247 may be effective for swinging the closure 236 clear of the blank mold 57, 58. Bolts 246' permit rearrangement desired of the sections 246, 247.

The thrusting actions, more particularly from the roller 226 through the arm 225 are not distributed to vibrate the T-unit rocker for the reason that table 30 carries a shock dissipating bumper, bracket 248 (Fig. 20) having cheek 249 contacting the stem 154 just above the roller 155 and below the split collar 243.

Blank mold plunger control

The roller 132, in the continuous travel of the blank mold counter-clockwise in approaching the forebay, is directed by cam 249 (Fig. 1) into upright position (Fig. 15). This cam 249 allows clearance so that in the tilting therefrom, this position of approximately dead center upright may be maintained in the lift over the wall 202 of the forebay and settling back into the forebay for suction. Then in the rise therefrom the roller 132 rides into cam portion 250 for holding the arm 130 upward and with the pin 128 at the stop position against the ear 126.

From this cam 250 extends cam 251 reversely rocking the arm 130 past the dead center position to cause the piston 105 to open the port 116 and then again close such port as the plunger is withdrawn from the neck finish and the inward limit of fall for this roller 132 is determined by cam portions 252, 253.

Blank mold opening

The continuation of the travel from the gather and packing operations, with the closure thereafter removed, is with the roller 72 coacting with cam 73. The roller 72 moves from cam portion 73 into cam portion 254 (Fig. 1) thereby pulling crosshead 65 radially inward in effecting opening of the blank mold sections 57, 58, which sections are held open during an arc interval toward the blow table 32 by cam 255 and are closed by cam 256. The opening of the blank mold 57, 58, leaves the blank suspended from the neck finish mold portions 82. Fixed with the crosshead 77 and upward therefrom is roller 257 which coacts with cam 258 as the blank molds have opened (Figs. 1, 14, 15) and thence travels in cam section 259 for thrusting the member 77 radially outwardly from the column 3 to cam portion 260 (Fig. 1) having a region approximating an arc concentric with the blow table column 4. Thereafter the cam 260 merges into cam portion 261 of similar radius to the cam portion 258 for retracting the crosshead 77 back into register position about the open blank molds 57, 58, so that as such molds are actuated toward closed position they effect closing of the neck finish sections 82. The neck finish molds were opened at the cam region 260 due to the action of the cam 131 (Figs. 14, 15) forcing the arm 130 to have cam face 263 engage nut 92 and depress the wedge 86 for effecting the neck finish opening.

Blank mold cooling

After the blank mold has discharged its gathered and formed blank to the blow table mold, and is in its cycle of operations back toward the forebay for gather, in many instances it is desirable to reduce the temperature of such gather molds. To this end there is mounted from the base 1, by brackets 264 (Figs. 21, 22, 23) shield 265 having water or liquid jet pipe 266 therein with supply line 267 thereto controlled by valve 268.

This jetting of the liquid upward into the mold as closing or before closing effects a reduction of the temperature in the mold and the residue from the supply of the sprayed liquid may be gathered by the shield or trough 265 and pass away by waste pipe 269.

In a region, say preferably following that of the liquid cooling supply, may be disposed chamber 270 having pressure air supply line 271 thereto. This chamber 270 is shown as having oppositely directed nozzles 272 and 273. With the air blast supply controlled by valve 274 for the line 271, there may be a blowing upwardly into the lower portions of the blank molds 57, 58, of a blast of cooling air to remove any liquid supply, if the liquid be used, and to clear out any accumulation of fine particles as well as reduce the temperature. In some instances, the blowing alone by air may be sufficient; in other instances the liquid alone; while in still other instances both may be used.

Transfer

When the roller 132 enters the cam way 131 (Fig. 27) at way portion 275, the wedge 86 is sufficiently depressed to initiate opening or cracking of the neck finish mold portions 82 so that there is not a tight holding by the neck finish of the blank therein, but that the suspending blank is only loosely held. The roller 132 coming to cam portion 276 effects full opening of the neck finish while riding into cam portion 277. The roller 132 in passing from the cam portion 277 to cam portion 278 allows the spring 87 (Fig. 15) to retract the wedge 86 so that the neck finish mold sections are in position for being closed by the leaf spring 80' in advance of the closing of the mold sections 57, 58, which swing toward each other during the cooling operation over the liquid jets 261 and the air jets 272, 273.

There is accordingly a completion of the cycle of operations at the first or blank table in getting the gather from the pool, forming such gather into a blank and bringing such blank into position for release to a blow mold on the blow table.

Blow table

The blow table 32 is carried by the antifriction bearings 33 (Fig. 29) sustained by ledge 279 of sleeve 280 on the column 4. This ledge and sleeve structure 279, 280, is sustained by split nut 37 providing antifriction bearing mounting 36 for this sleeve structure. The split nut 37 on the shaft 4 is adjusted by oscillating the lever 41 in a similar manner to the adjustment of the blank table on the column 3.

Blow mold mountings

The table 32 has thereover blow mold carrier deck 281 (Figs. 2, 29) having series of brackets 282 mounting hinge pins 283. These hinge pins provide bearings for arms 284, 285, carrying blow mold sections 286, 287. The deck 281 carries inwardly from the bracket 282, bracket 288 for guide rods 289 extending therefrom to the bracket 282. On these guide rods is slide 290 coacting through spring buffer 290' to actuate crosshead 291 having therefrom adjustable links 291' extending to arms 292 provided with bearings 293 fixed with bracket structure 282. Remote from the links 291' are arms 294 fixed with the arms 292. The outer free ends of the arms 294 are connected by links 295 with the respective blow mold sections 286, 287. Mounted on the crosshead 291 and upwardly therefrom is roller 296 coacting with cam 297 as approaching the transfer region, there directing the blow mold sections toward closing position. At cam portion 298 the blow mold sections are fully closed and continue therefrom during the blowing operation or operations until entrance into cam portion 299 where the blow molds have partial opening; the full opening at cam portion 301, and then the gradual closing in passing the cam portion 297. This cam 297, 298, 299, 301, is fixed with sleeve 302 on the column 4 against rotation with the deck 281. The closing occurs at the region of proximity to the blank table and after the neck finish has loosened its hold on the blank.

Blow head

From the brackets 282 there are mounted arms 303 extending upwardly and inwardly toward the column 4. Pivotally mounted in the brackets 282 at ears 304 is bearing pin 305 having arm 306 terminally carrying cylinder 307 (Figs. 2, 29, 30) having spherical self-adjusting tubular terminus 308 for seating on the closed blow mold sections 286, 287. The cylinder 307 has piston 309 therein with stem 310 therefrom to head 311 having cushion or gasket 312 as a spacer for coacting directly with the neck of the blank. Clamp engagement by the arm 306 with the cylinder 307 permits adjusting of the location of the cylinder 307 for different heights of blow molds.

Fixed with the arm 306 and at an angle rearwardly therefrom is arm 314 having yieldable link connection 315 with crosshead 316 reciprocable in guide 317 of one of the arms 303 by the action of roller 318 coacting with cam 319. At the inward pull of the short radius portion, this cam 319 (Figs. 2, 29) is adjacent the transfer position with the blow head 308 lifted clear of the blow mold.

As the travel is clockwise from this transfer position, cam 320 effects movement of the crosshead 316 radially outward and thus yieldably clamps the blow-head 308 down on the top of the closed mold 286, 287. This cam 319, 320, is mounted on the web carrying the cam 297 and is thus fixed with the sleeve 302 and the column 4. This down position for the blow head is maintained until toward the take-off station at cam 319' where there is a lift just enough to loosen at the blow mold. The cam 321 effects a lifting of the blow head in the travel toward the short radius region of the cam 319.

Blow mold bottom

Mounted below the bracket 282 on hinge pin 322 is depending arm 323 having adjustable connection by bolt 324 to auxiliary outwardly extending arm 325 (Fig. 29) having removably mountable thereon mold bottom 326. The arm 323 has adjustable yieldable link connection 327 to arm 328 upstanding from fulcrum bearing 329 fast with the table 32. This arm 328 has depending therefrom through opening 330 in the table, an arm 331 carrying roller 332 coacting with cam 333. This cam 333 (Figs. 29, 32) has a normal radius position holding the mold bottom 326 to be clamped into elevated position by the closed blow molds 286, 287.

At the opening of the blow molds effected by the cam 299, the roller 332 rides on cam portion 334 of greater radius, thus causing the link 327 to rock the mold bottom 326 so that article of blown ware 335 may tilt from the mold bottom 326, and be delivered by chute 336 for being conducted to lehr or away from the machine as may be desired. This roller 332 passes from this cam portion 334 to cam portion 337 merging into cam portion 333 thus to tilt back the mold bottom 336 into position before reaching the transfer station so that the blow mold sections 286, 287, may close thereabout and hold this mold bottom into position for receiving another blank in its cycle of operations hereunder.

*Finish blowing*

Upwardly through the column 4 extends pressure air line 338 having valve 339 therein to permit checking down of the amount of air to be supplied. This pressure air line 338 from upward through the column 4 (Figs. 2, 29, 33) extends downward to pad 339a (Figs. 33, 34) normally held by adjustable compression helical spring 340 in bracket 341 to position against ring 342. This ring or plate 342 is assembled with the arms 303 for rotating with the blow molds and is provided with port 343 to duct 344 (Figs. 2, 29, 30, 31) extending to terminal gland 345; from thence by lateral duct 346 to the cylinder 307. From this initial pressure blowing, air in the cylinder 307 passes by ports 347 and inside the blow head 308 through neck 348 of the article 335. This blowing operation occurs for the brief interval during which the rotary port 343 is in register with the non-rotary pad 339.

Thereafter, in the event there is desired a second or higher pressure blowing operation, such may be supplied through valve 350 for flow by pipe 349 extending into the lower portion of the column 4 and up out of the top thereof to pad 351 (Figs. 33, 35) adjacent to the pad 339a. There is accordingly, through the same flexible duct connection 344, a delivery of this additional high pressure air in the final blowing operation, and during the continuous travel of this blow mold on the blow table.

*Ware release from blow molds*

This pad 351 has beside the port for registering with the port 343, a port 351' (Figs. 33, 35) for registering with port 352 in the ring 342. This port 352 is connected by duct 353 to gland 345 at the opposite end of the hinge pin 305 to the connection of the duct 344 and has from such gland 345, duct 354 (Fig. 30) extending to connection 355 in head 356 of the cylinder 307, so that a puff of pressure air may flow by port 357 into the cylinder 307 above the piston 309 from the height as adjusted by screw 356' for the particular ware to depress such piston against the normal lifting action of spring 309' abutting ported plate 347' and thereby cause the stem 310 as carrying the terminus 311, 312, to yieldably press such terminus upon the upper end of the bottle neck or lip 348 in holding such bottle at the instant the blow mold sections 286, 287, start to open. The blown ware 335 is accordingly thus held for release from the blow mold as the blow mold sections 286, 287, open and is thus in upright position for delivery from the bottom 326 by tilting such bottom outward (Fig. 29).

*Operation*

However, while the operations may be considered as not definitely having stations because of the continuous travel of the machine, a diagrammatic showing may simplify the sequence as described in connection with the machine hereunder. The machine may be considered as started by throwing in the switch for the motor 5. With the tables 30, 32, thus continuously rotating, the blank mold sections 57, 58, are at station F (Fig. 42). At this region of station F, at arc 358 there is upward tilting of the blank mold carrier rocker to have the blank molds clear the entrance edge of the forebay with travel thereover and drop from such lift into the molten glass in arc region 359. At the drop for contact of the closed blank mold with the molten glass in the pool, there is suction for arc 360. There is approximately horizontal travel for the suction gathering blank mold through lesser arc 361 at glass level travel extending to station A before which the full gather is completed, and subsequent lift through a portion of arc 362 toward the baffle with the shearing operation occurring during this interval.

Directly thereafter there is baffle closing by swinging the bottom closure 326 as shown in dotted lines (Fig. 28) below the gather in the blank mold at arc region 363 and this bottom closure 326 remains in such blank mold bottom closing position during arc 364. Overlapping with the latter portion of this arc 364 at station B there occurs during arc 365 a packing of the blank in the blank mold. This series of arc operations completes the gather.

In the vicinity of station C there may be mold opening through arc 366. Coincident or therealong with the extent of this mold opening arc 366 is arc 367 for radial shifting control of the neck finish in effecting the transfer. This does not effect its initial radial movement until after the blank mold is opened and there is the removal of the neck finish plunger accompanied with the puff of air at arc 365' to promote a desired distribution of the glass in the blank. These arcs 366, 367, extend past the transfer station D to the region of station E. This station D is the point of proximity of the blank table with the blow table and as approaching such station D through arc 368, the neck finish is cracked or partially opened so that there is not a positive control of the formed blank when in the vicinity of the blow mold which is to receive such blank. During arc 369 the completion or full open travel region occurs for this neck finish.

From this counterclockwise travel of the blank half way around the blank table, there is transfer of such blank to the blow table at station G. As approaching this station G, the blow mold has a closing action through the latter portion of arc 370, terminally overlapping the neck finish opening arc 368. From this station G and toward station H there is section of arc 371 for lowering of the blow head in order that the blow head may be in position for low pressure blowing of the ware in the blow mold during arc 372 and high pressure blowing during arc 373, the low pressure blowing being from station H to I, and the high pressure blowing being from just past station I and past station J to just approaching station K and short of arc 371 where the blow head releases after the high pressure air has been cut off, thus permitting the blow head to hold the ware during mold opening.

Blow mold opening occurring at station K overlaps the piston puff or holding position of arc 374 and before the blow head is really lifted. Thereafter upon blow mold opening the bottom throw out for the finished ware occurs at arc 375.

The disposition of the tables for the production of blown ware is such that there is but slight clearance therebetween. It is desirable to have the radius of the arc of travel of the blow mold in excess of the travel of the blank mold, so that as the neck finish is thrust outward from the normal travel position, its lineal velocity may approximate, especially during the arc of the cam 260, the lineal travel of the blow mold for approximating coincidence in the loosening up of the blank at the neck finish and deposit thereof into the blow mold.

The location of the cams as to one arm on a table is such as to another or adjacent arm that as the load is applied for lifting action by one cam, there is a counterbalance action of another or adjacent arm to such cam action, thereby so distributing for balanced loading that this machine in its operation may be smooth against concussions for operating with a minimum of power, even at high rates of speed, in the production of high grade ware economically.

What is claimed and it is desired to secure by United States Letters Patent is:

1. A glass forming machine having a gather region, a carrier, a mold on the carrier for receiving a gather, a drive for the carrier defining a path for the mold at the gather region, a safety throw-out cam for precluding gather, automatic control means for effecting throw out shifting of the cam, and an adjustable stop determining cam position for gathering.

2. A glass forming machine having a gather region, a carrier, a mold on the carrier for receiving a gather, a drive for the carrier defining a path for the mold, a pneumatic supply device terminally against the mold at the gather region, a rockable arm port controller for differential pneumatic pressure distribution from the device to the mold, and a safety cam for the arm past the gather region precluding rocking of the arm at said region to change the pressure distribution to the mold.

3. A glass forming machine having a gather region, a carrier, a mold on the carrier for receiving a gather, a drive for the carrier defining a path for the mold, a pneumatic supply device shiftable terminally against the mold at the gather region, a rockable arm provided with a port, a supply connection to the port controllable by arm rocking for pneumatic pressure distribution from the device to the mold, and a self-locking toggle connection from the arm for the device.

4. A glass forming machine having a gather region, a carrier, a mold on the carrier for receiving a gather, a drive for the carrier defining a path for the mold, a pneumatic supply device shiftable terminally against the mold at the gather region and including a sleeve, and a spring holding the sleeve assembly toward mold engaging position.

5. A glass forming machine having a gather region, a carrier, a mold on the carrier for receiving a gather, a drive for the carrier defining a path for the mold, a pneumatic supply device shiftable terminally against the mold at the gather region and including a stem having a seat, a plunger axially and then angularly shiftable into assembly relation at said seat with the device, and a spring coacting with the stem and yieldably retaining the plunger in the seat.

6. A glass forming machine comprising a rotary carrier, a mold movably mounted as to the carrier, a pneumatic device having coaction with the mold, a ring rotatable with the carrier and provided with a ported face in a plane, extensible duct connection from the ring to the device, and differential pressure connections for the device including a self-adjusting block, a duct section, and a spring coacting with the duct section for yieldably acting against the duct section for holding the block against the face.

7. In glass manufacture, a blank mold having a pair of blank mold sections and a pair of neck finish mold sections, a carrier for the mold sections, control means for opening and closing the blank mold sections, said blank mold sections in closing holding the neck finish mold sections closed, additional control means from the blank mold sections for holding the neck finish mold sections initially from opening with the blank mold sections, said additional control means being operable to neck finish mold section releasing position by the blank mold section control means, and independently operable control means for opening the neck finish mold sections when the blank mold sections are opened.

8. A glass manufacturing machine comprising an open bottom mold, a mounting on which the mold is pivoted, a carrier as to which the pivoted mold is rockable with its mounting, a closure for the mold bottom, and a mounting for the closure on the rockable mounting for the mold, said mold mounting being shiftable relatively to the carrier, said closure having a vertically extending axis for effecting horizontal swinging of the closure transversely of the mold directly into mold bottom closing position.

9. A glass manufacturing machine comprising an open bottom mold, a mounting on which the mold is pivoted, a traveling carrier for the mounting as to which the mold is rockable with its mounting, a closure for the mold bottom, a mounting having a vertically extending axis for the closure for effecting swinging of the closure transversely of the mold horizontally directed into mold bottom closing position, said closure mounting being carried by the mold mounting for movement therewith relatively to the carrier, and an operating arm for effecting the swinging of the closure relatively to the carrier and mold mounting.

10. A glass manufacturing machine comprising an open bottom mold, a rockable mold-carrying traveling unit, a carrier for the unit, a closure for the mold bottom, a mounting having a vertically extending axis for the closure for effecting horizontal swinging of the closure directly against the mold open bottom into closed position, an operating arm for effecting the swinging of the closure, said unit having a depending portion mounting the arm and a bumper coacting with the depending arm.

11. A glass manufacturing machine comprising a mold having side sections and a bottom, a blow head for the mold, means for opening the mold side sections, and a ware engaging member within and movable relatively to the blow head for steadying the ware to rest upon the mold bottom away from the sections as the mold opens.

12. A glass manufacturing machine comprising an open bottom mold, a carrier therefor, and stationary cooling means below the mold embodying liquid bath spraying means, and thereafter drying and cooling draft delivery means into the mold in a series forming a plurality of of upwardly opposite directed nozzles.

13. Apparatus for forming hollow glassware comprising a parison mold having suction passages therein communicating with the mold cavity through a substantial portion of the length thereof, a cooperating neck mold having suction passages communicating with the suction passages of the parison mold, a combined suction and blowing unit associated with said neck mold and including a mouth forming pin reciprocally mounted therein, a suction and air pressure chamber in said unit, common means for applying suction and air pressure thereto, and means cooperating with said mouth forming pin for controlling the application of suction to the parison and neck mold cavities and air pressure only to the neck mold cavity.

14. Glassware forming apparatus including a sectional blank mold, a cooperating neck mold associated therewith and having a neck finish groove formed therein, and a mouth forming pin adapted to be moved relatively to the neck mold and to close the mouth opening of the neck finish groove when the glass charge is placed in the mold, means to present said blank and neck mold in neck uppermost position to gather a charge of glass from a molten mass, means for applying suction to the outer mouth finish edge of the neck finish groove axially of the neck mold and laterally along the blank mold cavity throughout a substantial length thereof to draw the glass charge into the mold and compact it in the neck mold around the mouth forming pin to form the mouth end of the article, means to withdraw the mouth forming pin from operative association with the neck mold, and means to admit air under pressure to the mouth end of the glass blank to blow it to hollow form in the blank mold while preventing entrance of pressure air laterally in the blank mold during the blowing of the parison to hollow form.

15. In a glassworking machine, a parison mold having longitudinal side wall suction passages in communication with the cavity thereof, a neck mold associated with said parison mold and having suction passages communicating with the suction passages of the parison mold, mouth forming pin mechanism associated with said neck mold; a valve casing associated with said neck mold and surrounding said mouth pin mechanism, a common suction and pressure air supply line to said casing, and means forming a part of said mouth pin mechanism and cooperating with said valve casing for connecting periodically said supply line to the neck mold and parison mold cavities, and means for actuating said last named means for controlling the admission of suction and pressure air from said supply line to the neck mold cavity above.

16. In a glassware forming machine, a circular series of parison molds and cooperating neck molds, a rotatable carrier therefor, means for applying suction to the neck and parison mold cavities to compact the charge therein, mouth forming pin mechanism arranged to close the mouth ends of the parison cavities when the glass charges are packed therein and to form an initial blow opening in the mouth end of the parison, means for applying air pressure to the neck mold cavity only in sufficient volume and pressure to blow the packed charge to hollow form while confined in the parison mold, a common passage for supplying suction and air pressure to said mold cavity, valve means for alternately supplying suction and pressure air to said passage, and means controlled by the movement of the molds actuating said suction and pressure air control valve means.

FRANK O'NEILL.